United States Patent
Knauerhase et al.

(10) Patent No.: US 7,181,521 B2
(45) Date of Patent: Feb. 20, 2007

(54) METHOD AND SYSTEM FOR SELECTING A LOCAL REGISTRY MASTER FROM AMONG NETWORKED MOBILE DEVICES BASED AT LEAST IN PART ON ABILITIES OF THE MOBILE DEVICES

(75) Inventors: Robert C. Knauerhase, Portland, OR (US); Scott H. Robinson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 862 days.

(21) Appl. No.: 10/393,617

(22) Filed: Mar. 21, 2003

(65) Prior Publication Data

US 2004/0186897 A1 Sep. 23, 2004

(51) Int. Cl.
*G06F 15/16* (2006.01)
*G06F 15/173* (2006.01)
*G06F 15/177* (2006.01)

(52) U.S. Cl. ............... 709/224; 709/203; 709/221; 709/225; 709/229

(58) Field of Classification Search ............ 709/203, 709/221, 223, 224, 225, 229
See application file for complete search history.

(56) References Cited

U.S. PATENT DOCUMENTS 6,477,573 B1 * 11/2002 Lea .......................... 709/224
2002/0062390 A1 * 5/2002 Tajima et al. ............... 709/244
2002/0133545 A1 * 9/2002 Fano et al. .................. 709/203
2002/0165945 A1 * 11/2002 Buswell et al. ............. 709/221
2003/0065710 A1 * 4/2003 Oakeson et al. ............ 709/203
2003/0191802 A1 * 10/2003 Zhao et al. ................. 709/203
2004/0064554 A1 * 4/2004 Kuno et al. ................. 709/225
2004/0128345 A1 * 7/2004 Robinson et al. ........... 709/203

* cited by examiner

*Primary Examiner*—Rupal Dharia
*Assistant Examiner*—Quang N. Nguyen
(74) *Attorney, Agent, or Firm*—Steven D. Yates

(57) ABSTRACT

Currently, global registries, such as ones offered by Microsoft Corporation (uddi.microsoft.com) or Hewlett Packard Corporation (uddi.hp.com), are used to register services offered by or desired by networked devices. Unfortunately, these registries are highly centralized and designed to be repositories for long-lived services, and thus are not amenable to operation of mobile devices, such as laptop computers, personal digital assistants, and other devices whose network address may change frequently as they move in and out of various local network environments. Moreover, when such mobile devices form ad hoc networks, access to the centralized repositories may not be available. To address these issues, devices of a local network may be configured to dynamically select a local master, from among devices attached to the local network and based on characteristics of the devices, where the selected device operates a registry for the local network.

30 Claims, 5 Drawing Sheets

METHOD AND SYSTEM FOR SELECTING A LOCAL REGISTRY MASTER FROM AMONG NETWORKED MOBILE DEVICES BASED AT LEAST IN PART ON ABILITIES OF THE MOBILE DEVICES

FIELD OF THE INVENTION

The invention generally relates to service registries, such as UDDI (Universal Description, Discovery and Integration) web services registries, and more particularly to facilitating selecting a local registry master from among networked mobile devices based at least in part on abilities of the mobile devices.

BACKGROUND

With the advent of large-scale network connectivity, e.g., interconnection between intranets, the Internet, WANs, LANs, etc. (the term "network" will be used herein to generally reference all networks types or combinations thereof), it has become increasingly difficult to locate and track networked devices, and to identify services or capabilities that may be offered by the networked devices. To facilitate locating and tracking devices and their services, various "web service" related technologies have been implemented.

The phrase "web service" describes a standardized way of describing, discovering, and integrating network applications, services and resources from different businesses using open standards, such as World Wide Web Consortium (W3C) and Internet Engineering Task Force (IETF) standards, including XML (Extensible Markup Language), SOAP (Simple Object Access Protocol), WSDL (Web Services Description Language), UDDI, UPnP (Universal Plug and Play), etc., over a network, such as the Internet or other network.

UPnP (see www.upnp.org) is a well-known cross-platform architecture allowing discovery of networking equipment devices that have come into contact with a network. UPnP relies on device broadcasts as they enter the network to learn abilities of other UPnP devices; UPnP is not highly scalable. Devices retain their own service descriptions. Consequently UPnP based networks do not ordinarily have a central registry allowing discovering service descriptions for other devices. Such registry services are provided by the UDDI initiative.

UDDI utilizes a global set of registries (also referred to as directories or databases) to allow businesses to define their services, share information about how the business interacts with other businesses or entities, and to permit searching for other businesses, web services, or services or resources presently available on a network. (See Internet Uniform Resource Locator (URL) www.uddi.org. As of this writing, the current UDDI specification is Version 3.0, published 19 Jul. 2002.) UDDI communicates with open standards, including XML, SOAP, HTTP (HyperText Transfer Protocol) and other protocols.

While UDDI's global nature provides a centralized source for locating offered services, such registries are geared towards storing long-lived data for clients at particular network addresses. This is impractical when a particular client, such as a mobile device, which may be temporarily in contact with several different networks, each assigning the device a different network address, and may arbitrarily enter or leave a network at any time. In addition, mobile devices may spontaneously form ad-hoc networks, where it would be impractical or impossible to negotiate services with a global registry.

BRIEF DESCRIPTION OF THE DRAWINGS

The features and advantages of the present invention will become apparent from the following detailed description of the present invention in which.

DETAILED DESCRIPTION

Figure 1:
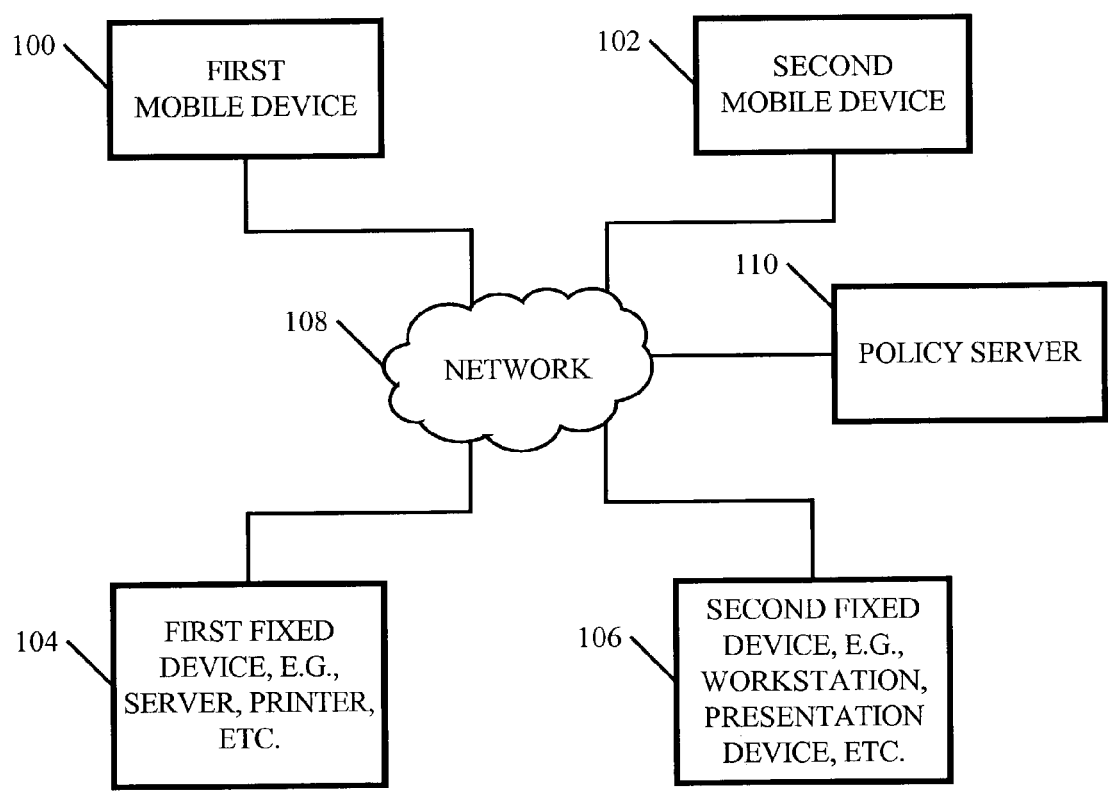
FIG. 1 illustrates a network according to one embodiment including first and second mobile devices and first and second fixed devices.

UDDI and related or equivalent environments provide registries that facilitate registering and locating devices offering or seeking certain services or resources. The present disclosure is focused on adapting such registry environments to operate efficiently with local networks, including ad-hoc networks, that may include mobile devices. The phrase "mobile device" as used herein is intended to generally reference devices expected to change location, as opposed to a "fixed device," which is intended to remain stationary for extended periods of time, e.g., a networked printer or computer. A local master is selected for the local network, where the local master maintains a registry for use by other devices of the local network. The local master may be a mobile device. When selecting a local master from among mobile devices, characteristics of the mobile devices, such as power, expected time in network, etc. may be used to determine which one is best suited to be a local master.

It will be appreciated by one skilled in the art that the invention may be practiced in conjunction with various fixed and mobile devices including, but not limited to, servers, workstations, desktop PCs, laptops, Personal Digital Assistant (PDA), telephones, tablets, virtual machines, etc., devices temporarily wired to an access point, as well as transportation devices that may incorporate or contain a computer or other computing device, e.g., private or public transportation, such as bikes, automobiles, trains, cabs, etc. In the description and claims that follow, the terms "device" or "devices" are intended to generally reference these various devices.

The invention may be utilized with various directory services, web services, Microsoft Corporation's NET services, UDDI registries, e.g., Microsoft Corporation's uddi.microsoft.com or Hewlett Packard Corporation's uddi.hp.com, and the like. In the claims, the term "registry" is intended to generally reference these various registries. However, for expository convenience, the detailed description focuses on UDDI registries. It will be appreciated that as times change, alternate registries or services will arise, and that the teachings herein are applicable thereto. Currently, registries such as UDDI registries, are highly centralized and designed to be repositories for long-lived services, and thus are not amenable to operation of mobile devices, such as laptop computers, personal digital assistants, devices temporarily obtaining (or offering) services at kiosks, airports, kiosk, etc., and other devices whose network address may change frequently. Moreover, when such mobile devices form ad hoc networks, access to the centralized repositories may not be available.

To address these issues, devices of a local network may be configured to dynamically select a local master based on characteristics of the devices, where the selected device then operates a local registry for the local network. Any device of a network, mobile devices included, may then utilize the local master in lieu a global registry, allowing for rapid updates to the local registry as mobile devices enter and leave the local network. If the local registry is unable to satisfy a particular request, a global registry, if available, may be accessed.

FIG. 1 illustrates a network according to one embodiment including first and second mobile devices 100, 102, such as mobile computers, personal digital assistants, or the like, and first and second fixed devices 104, 106, such as workstations, servers, printers, presentation devices, e.g., projectors, and the like.

These devices 100–106 are all communicatively coupled by way of a network 108. While various network communication protocols, techniques and processes may be utilized to communicate between these devices, for expository convenience herein, it is assumed (see also FIG. 2) that on contacting the network, a network communication address is determined for the first mobile device, and that communication is packetized in a conventional manner, e.g., according to TCP/IP (Transmission Control Protocol/Internet Protocol), where each packet has a source address including the determined network address, a destination address (which may be a particular address or broadcast address), payload, etc.

Let us assume that the first mobile device 100 is not yet communicatively coupled with the network 108, but the second mobile device 102 is communicatively coupled by way of a wireless link, and fixed devices 104, 106 are communicatively coupled by way of conventional wired technology. In this description and claims that follow, unless context expressly requires otherwise, the term "attach" and derivations thereof, e.g., "attaches," "attached," etc., encompass all possible wired and/or wireless communicative coupling technologies and combinations thereof.

It is assumed devices are appropriately configured to be capable of detecting their proximity to other wired and/or wireless devices, e.g., by peer radio detection, access to a location-based services registry, hotspot detection, etc. When the first mobile device attaches to the network 108, in one embodiment, the devices 100–106 attached to the network engage in an election (or other selection process) among devices communicatively coupled with the network to elect a local master for operating a registry. It will be appreciated that many different election processes known in the art may be applied.

The registry, e.g., a light-weight UDDI registry or equivalent registry, may be used to store various data, including, for example, services and service descriptions for services offered by or desired by attached devices. In the illustrated embodiment, each device 100–106 is assumed capable of operating the registry if the device participates in the election, and able to replicate (e.g. publish/delete) entries between registries so as to allow, for example, handing off registry entries between a departing previously-elected local master and a newly-elected local master.

In one embodiment, each device has an associated profile detailing the static and dynamic available capacities, capabilities and characteristics of the device, which may include one or more of: processing power, current processing load, available storage, power status (e.g., plugged-in, on batteries, estimated battery life remaining, etc.), network connectivity (e.g., wired or wireless), estimated duration in the current network neighborhood, trust status, platform configuration, software configuration and version, etc. The profile may include history information as well as future predicted or anticipated resource and configuration status such as prescheduled jobs (e.g. Unix CRON or AT scheduling facilities) or a given user's habit of manually launching database synchronization activity at the end of the stock market trading day to update stock portfolio spreadsheet. It will be appreciated that the profile be may stored as one or more entries within the registry itself and/or be maintained as separate data and/or metadata associated with a device. There also may be other associated profile information as well as stored procedures for analyzing history files (e.g. for making predictions about future compute, storage, network activity, etc.).

The device profiles may be used to influence the outcome of the election. In one embodiment, a policy engine is applied to weigh to device profiles to determine the election winner. In one embodiment, the policy engine is maintained by a policy server 110 attached to the network. In another embodiment, each device maintains a copy of the policy rules and the devices implement the policy in a peer-to-peer fashion. In another embodiment, attached devices temporarily select one device (perhaps at random) to operate temporarily as a policy server to decide the election. Depending on whether a policy server is utilized, in one embodiment, profiles are exchanged between the devices and/or with the policy server to facilitate holding the election.

It will be appreciated there may be any number of considerations in deciding a local master that may be encapsulated as an election policy rule. For example, an election may be determined based on one or more of the following considerations: whether a device is pre-determined as being reliable; whether a device is known to be of a trusted set of machines, e.g., machines provided by the network hotspot vendor, machines previously encountered and deemed trustworthy, etc.; whether a device is "powerful," e.g., fast processor(s), large storage, etc., whether a device is very active on the network; whether a device is offering relatively many services to the network; whether a device has the best power status of attached devices; whether a device is already the local master; whether the device has previously successfully been the local master; whether the device is likely to remain attached to the network; etc. For example, first and second fixed devices 104, 106 may be considered to have a very long duration in the current network, since they are fixed devices, and if provided by the operators of the local network, they may be considered to have high trust. Even if they do not have, for example, the highest processing power, one of these devices may win an election based on these other considerations.

When the election is determined, the winning device receives notification that it won and is now the local master. In one embodiment, the device stores (if not already present) in its registry at least the services offered and/or desired by the first mobile device, and it may also store services desired by the device. Once the local master is determined, other devices identify to the local master services offered by or desired by the other attached devices. For example, assuming the first mobile device 100 won the election, and operates a UDDI-type registry, other devices 102–106 may register with the local master and identify their offered or desired services. The first mobile device would then store these registrations as would a conventional UDDI registry server. If the first mobile device 100 did not win the election, it may then register with the winner.

In one embodiment, responsive to winning the election, the local master receives contents for the registry from a previous local master, thus saving existing devices from having to re-register with the new master. Devices not previously registered with the previous local master, or devices needing to update their registration, would of course need to register with the new local master.

It will be appreciated that many different approaches may be taken in determining when to hold an election, where some approaches are "more expensive" by requiring more communication by devices; for battery operated devices, minimizing communication is often paramount since "chatty" protocols may quickly drain resources. In one embodiment, on attaching to the network 108, a device may query (e.g., by way of general broadcast or other means) all devices on the network to locate the local master, and if not found, then the device may force an election to select a local master. In one embodiment, an election is held each time a new device attaches with the network. In one embodiment, a local master, if aware it is departing the network, forces an election to so that another local master may be selected. In one embodiment, elections happen periodically with periodicity determined, for example, based on the frequency of new arrivals and departures.

It will be appreciated various conditions may signal departure from the network, including by way of example but not limited to: powering-down, going to sleep (that is, entering a power-conserving "sleep" mode), going out of range of the network, and reducing operational ability. It will be further appreciated various conditions may signal reducing operational ability, including by way of example but not limited to: reducing processor speed, and losing available memory or storage sufficient to operate the registry. Since processor speed and/or memory may have been a significant reason why a particular device was chosen as local master, a reduction in these resources may require the election of a new local master.

Departure of a local master may be sudden, such as from failure of a communication device, unexpected powering off, rapid departure from the locality, emergency shut down, etc. Thus, in one embodiment, if the local master is non-responsive for some period of time, or non-responsive to a registration attempt, an election may be forced to pick another local master. In one embodiment, however, if the registry is large and rebuilding it is deemed too expensive, the registry may be distributed among multiple devices allowing its reconstruction if necessary. There are many techniques known in the art to allow distributing and recovering of data, including backup local masters that are periodically updated to remain coherent with the operational local master.

Figure 2:
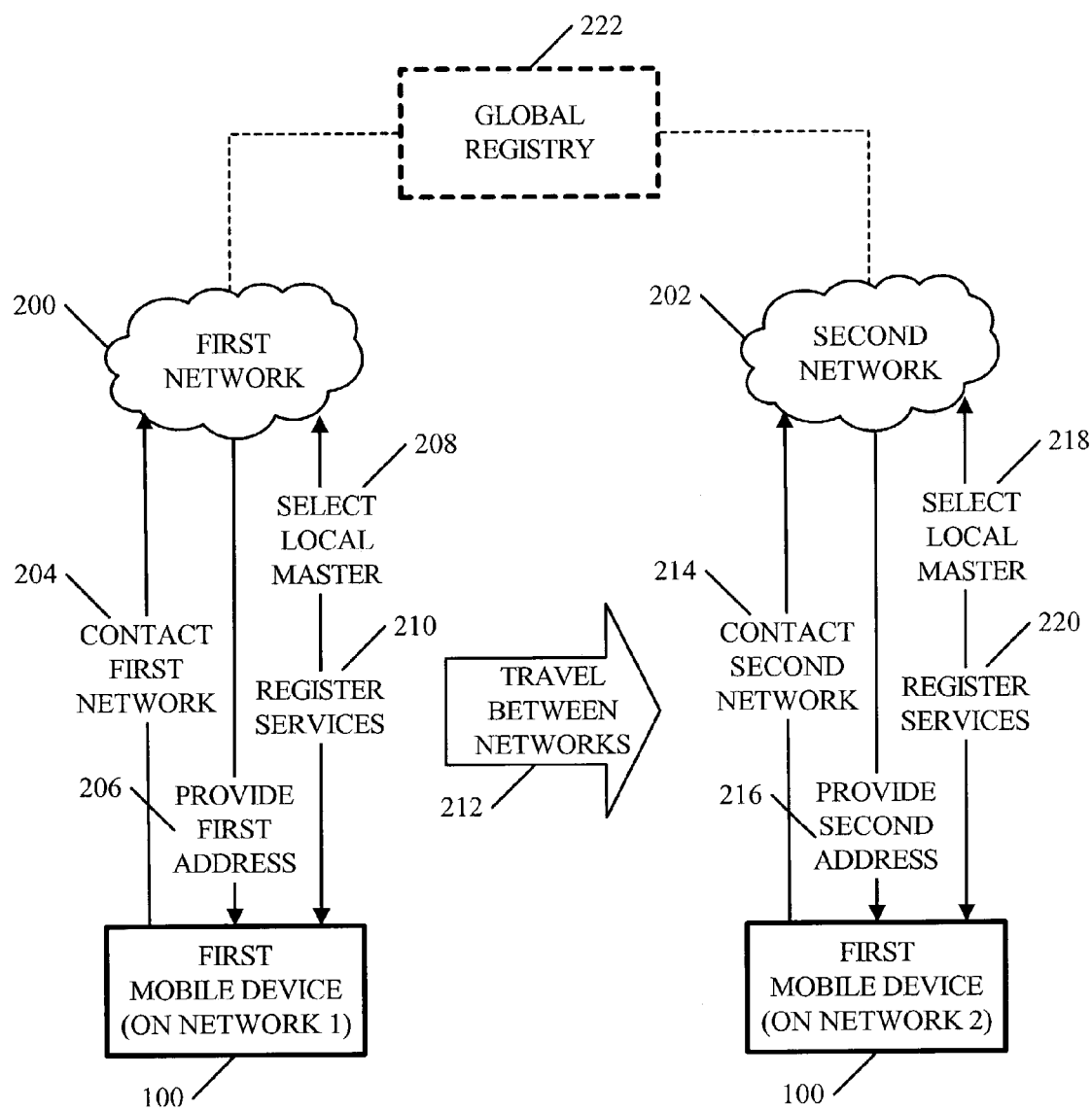
FIG. 2 is a data-flow diagram according to one embodiment illustrating movement of a mobile device between two networks.

FIG. 2 is a data-flow diagram according to one embodiment illustrating movement of a mobile device, such as the first mobile device 100 of FIG. 1 between two networks 200, 202, where each assigns the mobile device a unique network address for use by the device on its network. For example, the two networks may correspond to two different hotspots at an airport, each hotspot assigning a network address from a local pool of addresses. On entering the neighborhood of the first network 200 (or when resuming from a low-power state), the mobile device contacts 204 the first network.

For example, assuming a typical IEEE (Institute of Electrical and Electronics Engineers) 802.11 family wireless network, e.g. 802.11 a, 802.11 b, 802.11 g, or equivalent wireless protocol, when the mobile device comes in range of a network 200, 202, e.g. a Basic Service Set (BSS), the mobile device attempts to synchronize with the network. Under 802.11, the mobile device may elect to passively wait for an access point to transmit a beacon frame, or actively attempt to locate an access point by transmitting Probe Request frames and wait for a Probe Response frame from the access point. Once the access point is located, the mobile device authenticates with the access point and engages in an association process. Once associated with an access point, the mobile device may exchange data packets.

Assuming the mobile device and networks 200, 202 are configured to use DHCP (Dynamic Host Control Protocol) or an equivalent protocol to assign network communication addresses, the mobile device is provided 206 with a network address to utilize while communicating over the first network 200. Once communication between the mobile device and access point is established, and an address assigned, the mobile device may engage in an election or other process to select 208 a local master. As discussed above, various policies may be considered in determining which one of the devices attached to the first network will be selected as the local master.

Once the local master is selected, the first mobile device may register 210 services offered by the mobile device or desired by the mobile device. However, after some period of time, the mobile device travels 212 to the second network 202. As discussed above, the mobile device could have won the election and could be operating as the local master in the first network 200. In this case, assuming the mobile device is aware it is leaving the first network area, such as from signal attenuation, data errors, software signaling a departure or power down, increasing signal from the second network, etc., the mobile device (or other device recognizing the departure) may force another election so that a new local master is selected for the first network. Depending on the embodiment, some or all of the registry may be transferred to the new local master. In one embodiment, if the mobile device is aware it is departing, the mobile device deregisters its services from the registry. In another embodiment, the local master automatically purges a device's stale registry entries when it determines the device has departed.

Once the mobile device is in range of the second network 202, as discussed above, it contacts 214 the second network, and once communication is established, the second network provides 216 a second address with which the mobile device may use to communicate on the second network. Again, the addition of the mobile device to the network may result in another election to select 218 a local master, and once selected, the mobile device may again register 220 services offered by the mobile device or desired by the mobile device.

Since the mobile device may frequently travel 212 between multiple networks, each time obtaining 206, 216 different network addresses, it is not practical for the mobile device to attempt to register with a global registry 222, since the address for the mobile device is quickly stale. (The global registry is shown dashed since it may not be communicatively coupled with networks 200, 202.) Use of a local master configured to handle such short-lived registrations provides the benefits of a registry, such as a UDDI registry, but without the overhead of using a global registry.

Moreover, use of a local master facilitates power savings of mobile devices by reducing the amount of communication necessary since peer devices can query the local master rather than combinatorially querying each other for available services, thus saving battery life, and if on a subscription network, saving costs. By focusing query traffic on the local master, the device best able to handle it, individual devices are freed from having to expend power and resources communicating unnecessarily with peers, and peer devices avoid being unnecessarily brought out of low-power states. However, even though a local master may be utilized, it will be appreciated that a global registry 222 may also be used, since a mobile device may, for example, desire services not managed by the local master.

Using local registries improves scalability, as they can be configured in federated or hierarchical fashions as well. FIG. 2 shows a two-level hierarchy where the global registry could be aware of the local master for the networks 200 and 202. Dynamic local master registries also offer benefits for privacy or security. For example, local masters of a small company network might maintain registration of services with only local import, e.g. for access to special internal company services.

Figure 3:
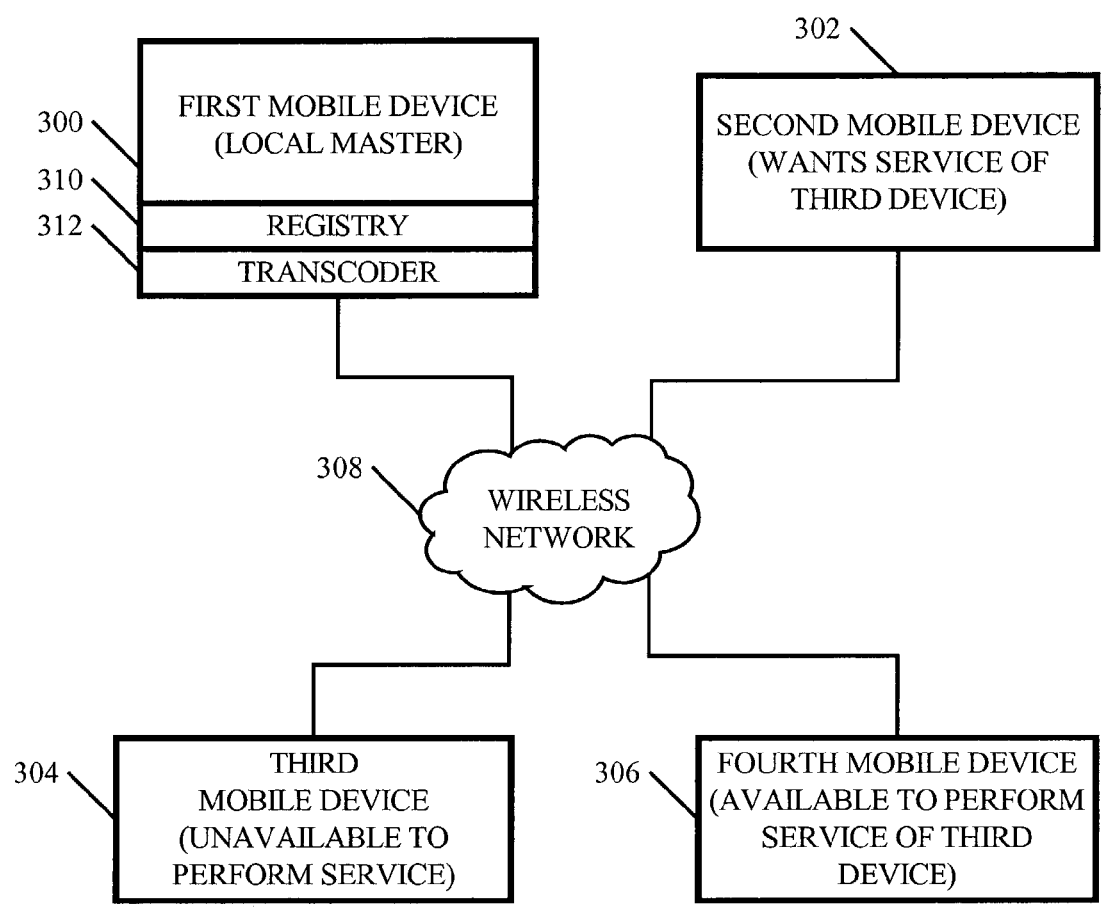
FIG. 3 illustrates a system according to one embodiment for a local master to transcode requests for services so they may be retargeted as needed.

FIG. 3 illustrates a system according to one embodiment for a local master to transcode requests for services, such as UDDI requests, so that they may be retargeted to allow for load balancing, handling when an original target is unavailable, if a more reliable device is found that may process a request, or for other reason.

Illustrated are first, second, third, and fourth 300–306 mobile devices attached to a wireless network 308. The first mobile device is operating as a local master for the network 308, and therefore its registry 310 stores services offered by or desired by the devices 300–306 of the network. The first mobile device also includes a transcoder 312 which may be used to modify registry requests. In one embodiment, the transcoder includes several modules or components, including an incoming request queue for buffering requests, a parser for rewriting requests, and storage for tracking rewritten requests. There may also be modules for security/encryption and digital rights/restrictions management to allow requests and responses to remain properly authenticated.

Figure 4:
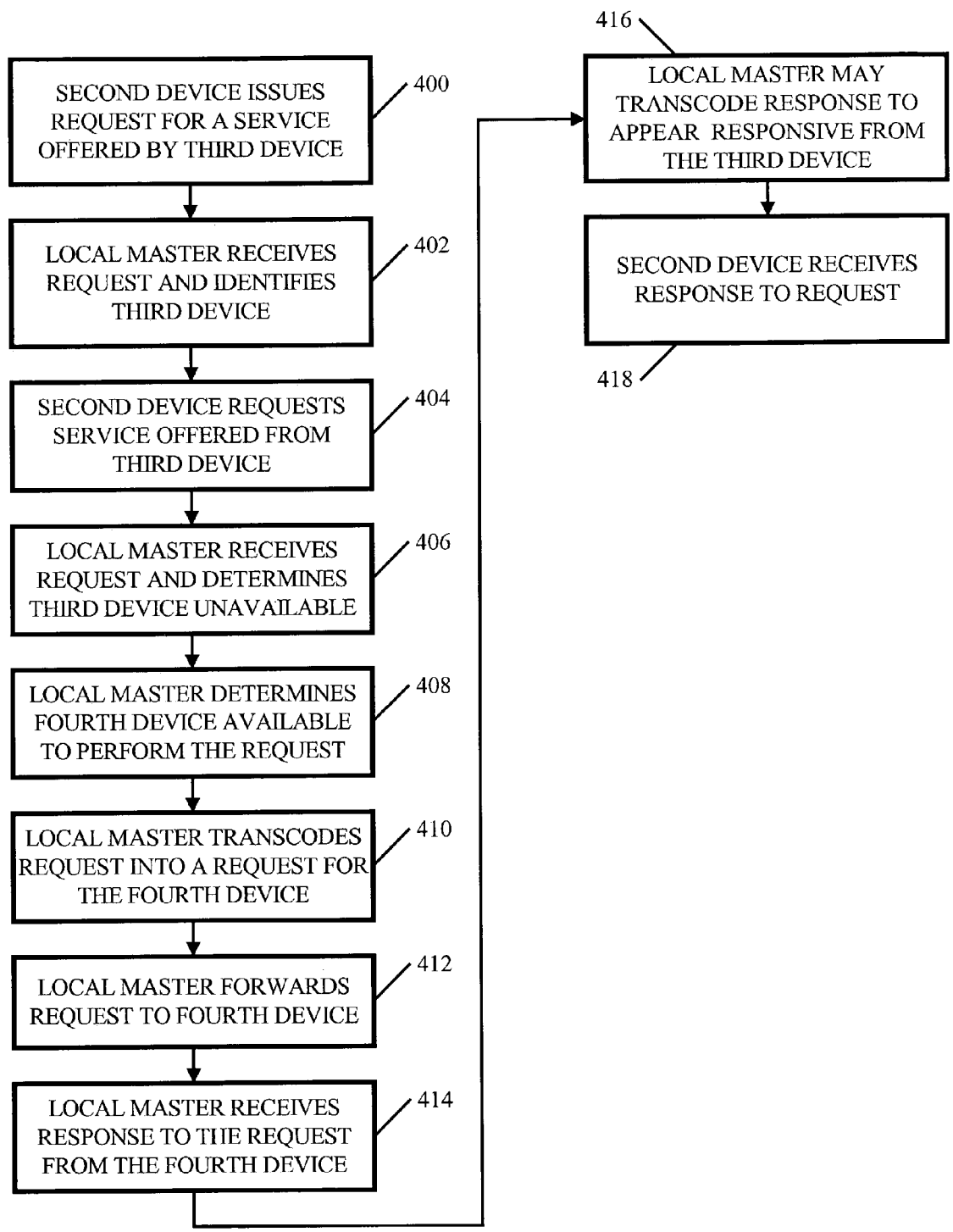
FIG. 4 illustrates a flowchart according to one embodiment of FIG. 3 for a local master to transcode service requests.

FIG. 4 illustrates a flowchart according to one embodiment of FIG. 3 for a local master 300 to transcode service requests. The second mobile device 302 wants a service offered by the third mobile device, but the third mobile device is unavailable, such as due to being in a low-power state. However, the fourth mobile device is currently available to perform the service desired of the third device.

The illustrated embodiment operates by the second mobile device 302 issuing 400 a request, such as a web services UDDI directory lookup request to locate a service. The request for service is received 402 by the local master 300, which parses (e.g., with a parser module of transcoder 312) the request, inspects its registry 310, determines the requested 400 service is available from the third mobile device 304. The local master then identifies the third mobile device to the second mobile device.

The second mobile device 302 then requests 404 the service from the third mobile device 304. In the illustrated embodiment, this request to the third mobile device is actually received 406 by the local master, e.g., the local master is operating as an intermediary, and the local master determines that the third device is currently unavailable to respond to the request. It will be appreciated that in order for the local master to receive the request, in one embodiment, when the local master identified the third device in 402, it actually identified itself as the service provider or service proxy (intermediary). In another embodiment, the protocol used by the devices 300–306 is designed so that all requests are routed through the local master.

Alternatively, in another embodiment, the local master 300 is embodied within an access point (e.g., wireless access point) or proxy (not illustrated) for the network 308, and therefore all communication will necessarily route through the access point or proxy, providing opportunity to transparently transcode requests as necessary. In this embodiment, no protocol revisions are required. It will be appreciated there may be several access points or proxies for a network operating in tandem to support transparent interception and transcoding of requests.

Although the third mobile device 304 is unavailable, the local master 300 may determine 408 that the fourth mobile device 306 has published within the registry 310 services that are capable of performing the service requested of the third mobile device. It will be appreciated that the fourth mobile device may offer the same service, a superset (e.g., broader service) including the desired service, or possibly an analogous or inferior service that might partially satisfy the request. In this latter case, the local master may negotiate (not illustrated) with the second mobile device to determine whether the lesser service is satisfactory (and this may cause a change in pricing if fees are associated with the performance of services).

In the illustrated embodiment, the local master 300 transparently transcodes 410 the request for the third mobile device 304 into a request for the fourth mobile device 306 and forwards 412 the transcoded request to the fourth mobile device. After the fourth mobile device receives and processes the request, the local master receives 414 a response to the request from the fourth mobile device. Continuing the role as transparent intermediary, the local master may again transcode 416 the response from the fourth mobile device so as to appear as to have originated from the intended third mobile device, before forwarding the response for receipt 418 by the second mobile device.

It will be appreciated by one skilled in the art that once the local master is operating as a transcoder of service requests, any number of other activities may also take place. For example, in one embodiment, even though the third mobile device 304 may have published a particular service that is desired by the second mobile device 302, when the second mobile device seeks to have the service performed, the third mobile device may be temporarily overloaded. Assuming that multiple devices are publishing the same or equivalent services, the local master 300 now has opportunity to operate as a load balancer, where the local master may determine that the third mobile device has a high load, but the fourth mobile device 306 does not have a high load, and therefore the request may be transcoded to apply to the fourth mobile device. In another embodiment, the local manager may present multiple devices attached to the network 308 as a single device perceived by other devices attached of the network. When requests are received for this device, the local manager may transcode the requests for distribution across all of the devices. The results of these devices might then be composed into the desired result form.

Figure 5:
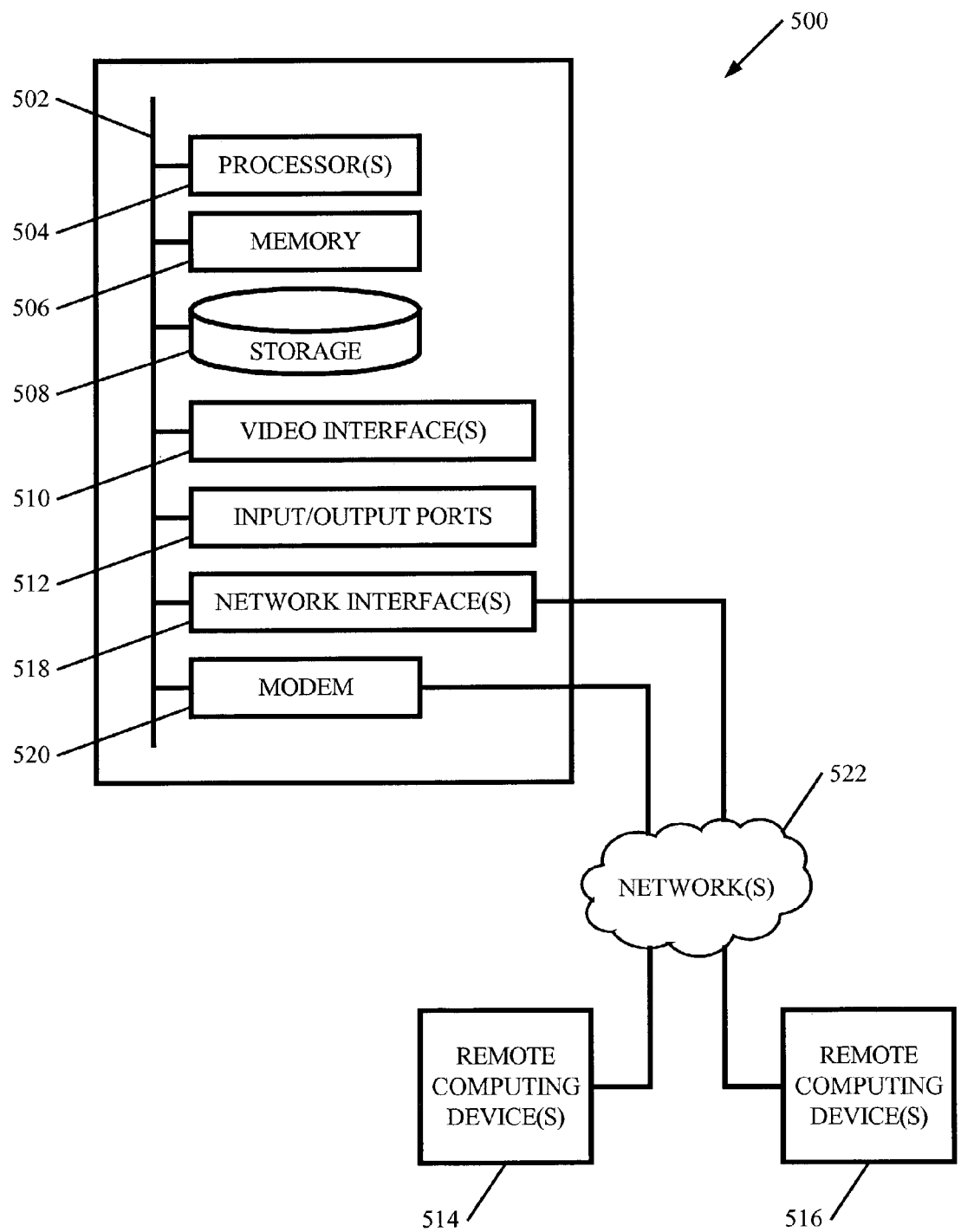
FIG. 5 illustrates a suitable computing environment in which certain aspects of the invention may be implemented.

FIG. 5 and the following discussion are intended to provide a brief, general description of a suitable environment in which certain aspects of the illustrated invention may be implemented. As used herein below, the term "device" is intended to broadly encompass a single device, or a system of communicatively coupled operating together.

Typically, the environment includes a device 500 that includes a system bus 502 to which is attached processor(s) 504, a memory 506, e.g., random-access memory (RAM), read-only memory (ROM), or other state preserving medium, storage 508, a video interface 510, and input/output interface ports 512. The device 500 may be controlled, at least in part, by input from conventional input devices, such as keyboards, mice, etc., as well as by directives received from another device, interaction with a virtual reality (VR) environment, biometric feedback, or other input source or signal.

The device 500 may include embedded controllers, such as programmable or non-programmable logic devices or arrays, Application Specific Integrated Circuits, embedded computers, smart cards, and the like. The device may utilize one or more connections to one or more remote device 514, 516, such as through a network interface 518, modem 520, or other communicative coupling. Devices may be interconnected by way of a physical and/or logical network 522, such as the networks 108, 200, 202, 308 discussed above with respect to FIGS. 1–3, the Internet, or other networks. And, although the foregoing discussion has focused on networks including wireless network portions utilizing the IEEE 802.11 family of protocols, one skilled in the art will appreciated that communication with network 522 may utilize other wired and/or wireless short range or long range carriers and protocols, including radio frequency (RF), satellite, microwave, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, volatile and/or non-volatile memory 506, or in storage 508 and their associated storage media, including hard-drives, floppy-disks, optical storage, tapes, flash memory, memory sticks, digital video disks, biological storage, etc. Associated data may be delivered over transmission environments, including network 522, in the form of packets, serial data, parallel data, propagated signals, etc., and may be used in a compressed or encrypted format. Associated data may be used in a distributed environment, and stored locally and/or remotely for access by single or multi-processor machines.

Thus, for example, with respect to the illustrated embodiments, assuming device 500 embodies the local master 300 of FIG. 3, remote devices 514, 516 may respectively be the second mobile device 302 of FIG. 3, and the global registry 222 of FIG. 2. It will be appreciated that remote machines 514, 516 may be configured like device 500, and therefore include many or all of the elements discussed for it.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. In a network including mobile devices intermittently communicatively coupling with the network, a method comprising:
   determining a first profile for a first mobile device;
   querying the network for a local master device operating a registry;
   reguesting a first election if no local master device is located;
   engaging in the first election among the mobile devices communicatively coupled with the network to elect the local master device for operating the registry for storing at least services offered by the mobile devices communicatively coupled with the network, the first election being decided based at least in part on the first profile;
   receiving notification of the first mobile device winning the first election; and
   storing in the registry at least services offered by the first mobile devices,
   wherein the first election comprises selecting a mobile device among the mobile devices communicatively coupled with the network as the local master device for operating the registry based at least in part on a weighted scoring of device characteristics associated with ability to operate as the local master device.

2. The method of claim 1, wherein the device characteristics associated with ability to operate as the local master device comprise:
   existing local master status; likelihood of continued communicative coupling with the network; number of processors; processor speed; storage space; network throughput; network activity; longest estimated power life; platform configuration; software configuration; history information; and anticipated future resource availability.

3. The method of claim 1, further comprising:
   determining a network address for the first mobile device to use in communicating with the network;
   packetizing communication with the network, each packet having a source address including the determined network address, and a destination address; and
   broadcasting packets for the first profile to the network, wherein broadcasting comprises utilizing a destination address such that each of the network's communicatively coupled devices may receive the broadcasted packets.

4. The method of claim 3, further comprising receiving the network address from an address server on the network.

5. The method of claim 1, further comprising:
   receiving from a second mobile device, responsive to having won the election, identification of services offered by or desired by the second mobile device; and
   storing said identified services in the registry.

6. The method of claim 1, further comprising receiving, responsive to having won the election, contents for the registry from a previous local master.

7. The method of claim 1, wherein the registry is further for storing services offered or desired by the network's communicatively coupled devices.

8. The method of claim 1, wherein an election is held each time a new device becomes communicatively coupled with the network.

9. The method of claim 1, wherein an election is held when the elected master becomes communicatively uncoupled from the network.

10. The method of claim 1, further comprising:
determining a departure of the first mobile device from the network; and
engaging in a second election to select another one of the network's communicatively coupled devices to operate the registry.

11. The method of claim 10, wherein the departure is a selected one of the first device: powering-down, going to sleep, going out of range of the network, and reducing operational ability.

12. The method of claim 11, wherein reducing operational ability is a selected one of: reallocating processor resources, reallocating storage resources, losing network bandwidth, reducing processor speed, and losing available memory sufficient to operate the registry.

13. The method of claim 1, further comprising:
monitoring a wireless interface for being in range of any networks; and
determining the network is in range of the wireless interface.

14. The method of claim 1, further comprising:
distributing the registry across multiple ones of the network's communicatively coupled devices to allow reconstruction by a second device of the registry if the first device unexpectedly becomes unavailable.

15. The method of claim 1, further comprising:
forming a spontaneous ad-hoc grouping of devices communicatively coupled to the network; and
periodically holding subsequent elections to ensure a most capable device is operating as the local master for the devices communicatively coupled with the network.

16. In a network including mobile devices intermittently communicatively coupling with the network, a method comprising:
determining a first profile for a first mobile device, the profile including services offered by the first mobile device;
querying the network for a local master device operating a registry;
requesting a selection of the local master device if no local master device is located;
periodically applying a policy for selecting the local master device for operating the registry for storing at least services offered by or desired by the mobile devices communicatively coupled with the network, the selecting being decided based at least in part on the first profile;
receiving notification of which mobile device is the local master device; and
publishing at least a portion of the first profile into the local master device,
wherein applying the policy for selecting a mobile device among the mobile devices communicatively coupled with the network as the local master device for operating the registry based at least in part on a weighted scoring of device characteristics associated with ability to operate as the local master device.

17. The method of claim 16, wherein applying the policy to select the local master comprises:

selecting a device as the local master based at least in part on the device being a member of a set of devices pre-authorized to operate as the local master.

18. The method of claim 16, wherein applying the policy to select the local master comprises:
selecting a device as the local master based at least in part on the device being a member of a set of trusted devices.

19. The method of claim 16, wherein applying the policy to select the local master comprises selecting a device as the local master based at least in part on whether the device is currently the local master.

20. The method of claim 16, wherein applying the policy to select the local master comprises selecting a device as the local master based at least in part on a likelihood of continued communicative coupling by the device with the network.

21. The method of claim 16, wherein applying the policy to select the local master comprises selecting a device as the local master based at least in part on a weighed scoring of some or all of the following device characteristics:
number of processors; processor speed; storage space; network throughput; network activity; and longest estimated power life.

22. The method of claim 16, further comprising:
receiving a first request for a first service offered by a second mobile device; and
rewriting the first request into a second request for a second service analogous to the first service and available from a third device.

23. The method of claim 22, further comprising:
determining the second mobile device is unavailable and rewriting the first request responsive thereto.

24. The method of claim 23, further comprising:
load-balancing requests for services by determining a load for the second device, and rewriting the first request if the load exceeds a threshold.

25. A system, comprising:
a first mobile device having a first profile;
a second mobile device having a second profile and being communicatively coupled with the first mobile device by way of a network;
querying the network for a local master device operating a registry;
requesting a first election if no local master device is located;
the first and second mobile devices being configured to engage in the first election among the first and second mobile devices to elect the local master device for operating the registry for storing at least services offered by mobile devices communicatively coupled with the network, the first election being decided based at least in part on the first and second profiles,
wherein the first election comprises selecting a mobile device among the first and second mobile devices as the local master device for operating the registry based at least in part on a weighted scoring of device characteristics associated with ability to operate as the local master device.

26. The system of claim 25, wherein the first election comprises the first and second mobile devices comparing selecting ones of the characteristics:
existing local master status; likelihood of continued communicative coupling with the network; number of processors; processor speed; storage space; network throughput; network activity; longest estimated power life; platform configuration, software configuration; history information; and anticipated future resource availability.

27. The system of claim 25, further comprising the first device being configured to receive a notification of having won the first election, responsive thereto to receive identification of services offered by or desired by the second mobile device, and to store said identified services in the registry.

28. In a network including mobile devices intermittently communicatively coupling with the network, an article comprising a machine-accessible storage media having associated data stored thereon, wherein the data, when accessed by a computer processor, results in a machine performing:

determining a first profile for a first mobile device;

querying the network for a local master device operating a registry;

requesting a first election if no local master device is located;

engaging in the first election among the mobile devices communicatively coupled with the network to elect the local master device for operating the registry for storing at least services offered by the mobile devices communicatively coupled with the network, the first election being decided based at least in part on the first profile;

receiving notification of the first mobile device winning the first election; and storing in the registry at least services offered by the first mobile device, wherein the first election comprises selecting a mobile device among the mobile devices communicatively coupled with the network as the local master device for operating the registry based at least in part on a weighted scoring of device characteristics associated with ability to operate as the local master device.

29. The article of claim 28 wherein the data for engaging in the first election further includes data, which when accessed, results in the machine performing:

selecting a device as the local master based at least in part on a weighed scoring of some or all of the following device characteristics:

existing local master status; likelihood of continued communicative coupling with the network; number of processors; processor speed; storage space; network throughput; network activity; longest estimated power life; platform configuration, software configuration; history information; and anticipated future resource availability.

30. The article of claim 28 wherein the machine-accessible media further includes data, when accessed, results in the machine performing:

receiving from a second mobile device, responsive to having won the election, identification of services offered by or desired by the second mobile device; and storing said identified services in the registry.

* * * * *